United States Patent [19]

Ridgway et al.

[11] 4,170,033

[45] Oct. 2, 1979

[54] MULTI-TRACK HEAD WITH SHIELDING ELEMENTS INTERCONNECTED WITH LOW RESISTANCE CONDUCTIVE PATHS

[75] Inventors: Peter C. Ridgway, Staines; Derek F. Case, Sunbury, both of England

[73] Assignee: Data Recording Instrument Company Limited, Staines, England

[21] Appl. No.: 886,271

[22] Filed: Mar. 13, 1978

[30] Foreign Application Priority Data

Mar. 15, 1977 [GB] United Kingdom ............... 10796/77

[51] Int. Cl.² .................. G11B 5/115; G11B 5/22; G11B 5/28
[52] U.S. Cl. .................. 360/121; 360/122; 360/125
[58] Field of Search ............... 360/121, 122, 125, 126, 360/120, 124

[56] References Cited

U.S. PATENT DOCUMENTS

| | | | |
|---|---|---|---|
| 2,615,990 | 10/1952 | Blaney et al. | 360/121 |
| 3,486,220 | 12/1969 | Braun et al. | 360/121 |
| 3,495,325 | 2/1970 | Bos et al. | 360/121 |
| 3,529,349 | 9/1970 | van de Schoot et al. | 360/121 |
| 3,806,902 | 4/1974 | Drees et al. | 360/121 |
| 3,864,753 | 2/1975 | Becker et al. | 360/121 |

*Primary Examiner*—Alfred H. Eddleman
*Attorney, Agent, or Firm*—Hane, Roberts, Spiecens & Cohen

[57] ABSTRACT

A construction of a multi-track read and write head assembly is disclosed in which conductive shielding elements are interconnected with low resistance conductive paths by means of electrically conductive layers plated onto the shielding elements.

6 Claims, 2 Drawing Figures

MULTI-TRACK HEAD WITH SHIELDING ELEMENTS INTERCONNECTED WITH LOW RESISTANCE CONDUCTIVE PATHS

BACKGROUND OF THE INVENTION

This invention relates to magnetic signal transducing heads and to methods of manufacturing such heads.

It is common practice to provide an assemblage which includes a number of magnetic heads in close proximity for reading and/or recording on parallel tracks. For example, a current standard for magnetic tape systems for computers requires a 9 track head. One form of such a multi-track head is shown in British Pat. No. 1184150. This particular form of construction provides separate read and write heads.

A common problem with heads which are closely spaced is that of unwanted signal transfer form one head to another, which is usually referred to as "crosstalk." It is usual to provide shields between the heads to reduce the crosstalk signals. These shields may consist of magnetic material, electrically conductive material, or a combination of the two kinds of material. Whilst the level of crosstalk is reduced by such shields, it is often found in practice that the reduction is non-uniform. Thus, there may be a variation of 5 to 1, or more, between the level of crosstalk on different head assemblies, or in the case of multi-track head assemblies even between different pairs of heads in the same assembly.

SUMMARY OF THE INVENTION

According to one aspect of the invention a magnetic head assembly having at least a pair of magnetic heads and electrically conductive shielding associated with said heads, said shielding being formed of at least two separate electrically conductive elements, includes plated conductive layers providing electrical interconnections between the conductive elements for the flow of induced electrical loop currents, said interconnections having a lower and more uniform resistance than is provided by any other conductive path between said elements.

According to another aspect of the invention a process for the manufacture of a magnetic head assembly includes the steps of providing a plurality of heads and at least two electrically conductive shields, plating at least part of each shield with a layer of an electrically conductive metal which does not oxidise at room temperature, and assembling the heads and shields alternately with the plated parts of each shield in contact with the plated part of the adjacent shield so that the plated areas provide a low resistance connection between the shields.

According to a further aspect of the invention a process for the manufacture of a multi-track magnetic head assembly includes the steps of forming a two rows of heads with conductive shields arranged between said rows, securing the heads and shields together, and forming a plated layer on two opposite faces of the assembly, other than the face containing the operating gaps, which layers conductively connect opposite ends of the shields together.

BRIEF DESCRIPTION OF THE DRAWINGS

A construction of magnetic head and a method of manufacturing such a head in accordance with the invention will now be described in more detail with reference to the accompanying drawings in which.

Figure 1:
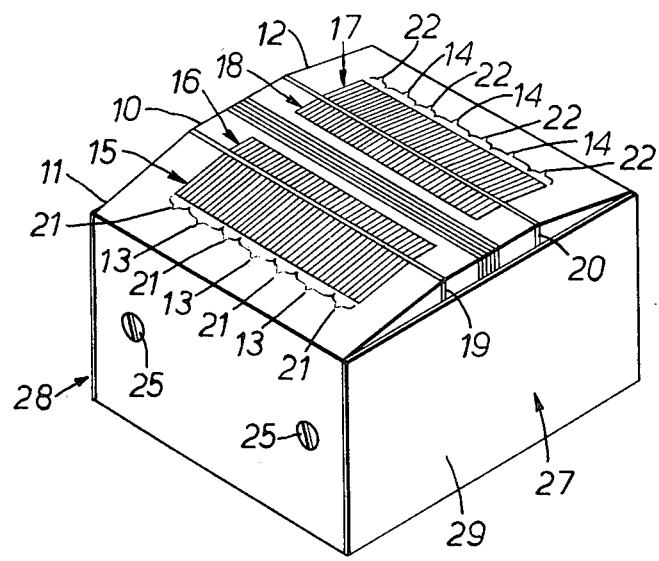
FIG. 1 shows a multi-track read and write head assembly

Referring first to FIG. 1, a magnetic head assembly includes a centre body member 10 and outer body members 11, 12. The body members, 10, 11, 12 carry a plurality of write heads 13 and a like plurality of read heads 14. The write heads include C and I cores formed of laminations of magnetic material such as mumetal. The C cores 15 are mounted in one outer body member 11 and the I cores 16 are mounted in the centre body member 10. Likewise the read heads 14 include laminated C and I cores with the C cores 17 mounted in the outer body member 12 and the I cores 18 mounted in the centre body member 10. The C and I cores of the read and write heads are positioned opposite one another with non-magnetic transducing gaps therebetween, the gaps of the write heads being aligned along a line 19 and the gaps of the read heads being aligned along a line 20 extending parallel to the line 19. The cores of the read heads 13 and of the write head 12 are spaced so that their transducing gaps are spaced at the required track separation along the lines 20 and 19 respectively. Intertrack screens 21, 22 consisting of alternate magnetic and electrically conductive laminations are interposed between the write heads 12 and between the read heads 13 respectively. The magnetic laminations may be of mumetal and the conductive laminations may be of brass. Extending between the read heads 13 and the write heads 12 are further screens consisting of magnetic laminations 23 and electrically conductive laminations 24. These screens 23, 24 are arranged alternately, there being, for example, five mumetal laminations and four brass laminations. The body members 10, 11, 12 are formed of conductive material such as brass and are held together by clamping screws 25. Spacers of non-magnetic material 26 (FIG. 2) are positioned between the C and I cores to maintain the desired gap dimension between the cores. These spacers 26 may consist of shims clamped between the body members or may be formed by depositing non-magnetic material on the body 10 or bodies 11 and 12.

The head assembly may be manufactured as follows. The body members 11, 12 each have a slot machined therein and the C cores 15, 17 with windings thereon (not shown) and intertrack screens 21, 22 are bonded with suitable adhesive into these slots. The centre body member 10 is machined to provide two slots on opposing faces and a further slot extending transversely between the two slots. A stack of screens 23 and 24 are bonded together and into the central transverse slot in the body member 10 with adhesive. As mentioned above the screens 23 are of magnetic material and the screens 24 are of electrically conductive material. The I cores and intertrack screens are then bonded into the opposed slots in the centre body member 10. The faces of the body members 10, 11, 12, which is the final assembly will opposing one another, together with the cores and intertrack screens secured therein are machined to provide accurately planar faces. The body members 10, 11, 12 are then assembled together and clamped by means of the screws 25 with the spacers 26 interposed between the opposing faces of the cores to provide the required non-magnetic gap therebetween.

The upper surface (as viewed in FIG. 1) is machined to give the assembly the desired profile for the feeding of a magnetic recording tape across the surface such that it is in contact with the pole tips of the magnetic cores in the vicinity of the transducing gaps.

The front face 27 of the assembly and its opposite face 28, not visible in FIG. 1, but indicated by the arrow 28, are machined to remove surplus adhesive and to ensure that the edges of the screen laminations 23, 24 are cut back to be co-planar with the finished faces 27, 28. The rear face 28 acts as a reference face for the mounting of the head assembly in a tape deck and for this reason further material is machined from this face 28 until the transducing gaps of the heads lie at desired spacings from the rear face 28.

In operation of a magnetic head assembly as above described, the write heads 12 are energised by passing signal currents through the windings thereof to generate magnetic fields at the transducing gaps. These fields are effective to magnetise areas of the magnetic tape and hence to record the signals as magnetised areas. However, these magnetic fields tend to induce magnetic flux in the cores of the read heads 13 which produces spurious read signals from the read heads. Ideally the read heads should respond only to magnetised areas of the tape as it passes the transducing gaps of the heads. The brass body members 10, 11, 12 and the screens 23, 24 act to reduce this direct induction of signals in the read heads 13, referred to as crosstalk. However, it has been found that although the crosstalk is reduced, there are large variations in the magnitude of the crosstalk between different head assemblies of the same design and also in the magnitude of the crosstalk for different tracks of a head assembly.

Figure 2:
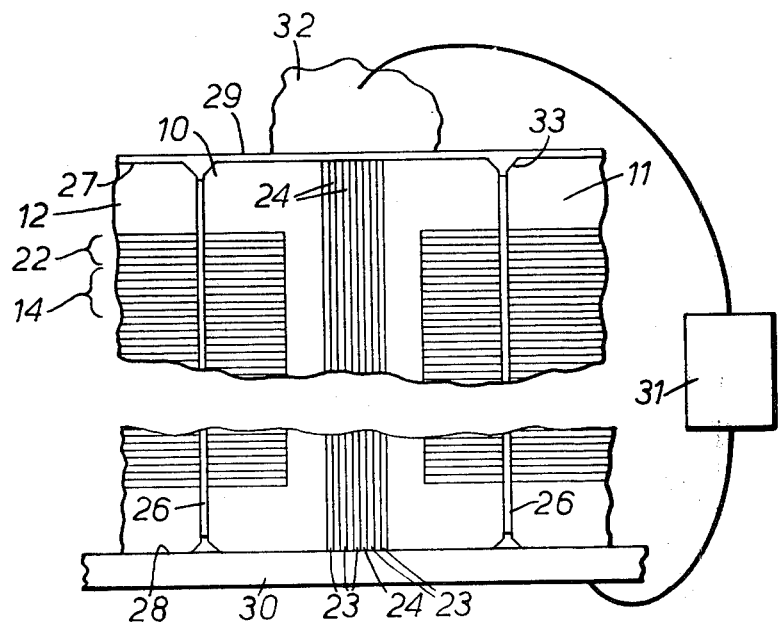
FIG. 2 is a part view of a multi-track assembly depicting the step of plating electrically conductive strips thereon.

The applicants have found that a significant reduction in these variations in magnitude of the crosstalk can be obtained by providing on each of the finished faces 27, 28 of the assembly electrical interconnections 29. These interconnections serve to provide low resistance paths interconnecting the screens 23, 24 to the body member 10 and to interconnect the body members 10, 11, 12. These interconnections are formed by electroplating and this may be accomplished as follows as shown in FIG. 2.

The assembly is placed with its face 28 on a copper plate 30 which is attached to one terminal of a DC power supply 31 which provides some 10 to 12 volts. The other terminal of the power supply 31 is connected to a swab 32 of cotton wool, which is soaked with a commercially available proprietary plating electrolyte, a suitable acid plating solution for the plating of copper is supplied by Metadalic Ltd. The swab is rubbed across one face 27 whilst the plating potential is applied. A layer 29 of copper about 0.003 inches thick can be deposited in about ten minutes by this process. The assembly is then turned over and the process is repeated on the opposite face 28. The faces 27, 28 which are chosen for this treatment are the two major faces which are substantially perpendicular to the upper surface of the assembly which contains the operating gaps.

Preferably the edges 33 of the body members are chamfered before assembly and this assists in building up the thickness of the plating at the interfaces between the body members. The layer 29 of copper should extend up to near the upper tape engaging surface of the assembly and, in order to obtain the greatest reduction in variation of crosstalk levels, the layer 29 should extend downwards beyond the lowest parts of the head cores and preferably down to the lowest parts of the body members, thus substantially the whole of faces 27, 28 is subjected to the plating.

If desired, instead of interconnecting the body members by plating onto the faces 27, 28, the plating may be effected on the opposing faces of the body members prior to assembly in the form of plated pads. The plating in this case would be of a material such as gold which does not readily corrode or oxidise under normal atmospheric conditions. The plating is of such a thickness that the plated areas are pressed against one another to make low resistance electrical connections when the gaps between the C and I cores have the desired dimensions.

The application of the invention effects a surprising improvement in the performance of the heads in an assembly. In one particular test, the feedthrough, or crosstalk, voltage in one head of an untreated assembly was 3,000 microvolts. The assembly was then plated with copper layers, as described above. The treated assembly was subjected to the same test and the crosstalk voltage was found to have decreased to 100 microvolts.

It has been found that the application of the invention not only avoids the occurrence of large crosstalk levels of the different heads in the assembly. Such uniformity simplifies the setting of signal clipping levels in the amplifiers for the heads, for example.

From tests which have been carried out by the Applicant, it seems probable that the non-uniformity, and excessive level of crosstalk is due to imperfect conductive contact between the screen laminations and the body member 10 and also between the body members 10, 11, 12. The brass laminations and body members acquire a very thin insulating layer very quickly, due primarily to the zinc content of the brass. Thus, cleaning of the brass, even a short time before assembly, does not ensure that a low resistance contacts exist between the conductive parts of the assembly.

The screening of magnetic heads from unwanted magnetic fields by means of electrically conductive screen members relies for its effectiveness upon the induction of circulating loop currents in the screen members by the unwanted magnetic fields. The e.m.f. driving such induced currents is extremely low and hence normal contact resistance between screen members can be sufficiently high as to impede the flow of these loop currents.

The action of plating ensures that there is a low resistance between conductive parts of the assembly. In the case in which strips 29 are formed across faces 27, 28 of the assembly, the strip 29 provides a low resistance connection to and between each of the screen laminations, since it is plated on to their edges. In the case in which pads are formed, each pad provides a clean surface which can form a low resistance to the pad on the adjacent body member.

It will be appreciated that the materials may be varied to suit the necessary shielding and conductive properties required. For example, the screening may be copper, instead of brass, with the connection being made by a strip of silver plating. Furthermore, the invention may apply to forms of multiple head unit which employ conductive screens, other than that described above.

We claim:

1. A magnetic head assembly consisting of a magnetic read head, a magnetic write head and electrically conductive shielding co-operating with said magnetic heads to reduce the level of signals induced directly in the read head as a result of energisation of the write head, said assembly including

- a plurality of first electrically conductive non-magnetic shield elements of planar form and a plurality of planar laminations of magnetic material arranged in a stack with the conductive elements and the magnetic laminations parallel to one another, the magnetic laminations being positioned alternately with the conductive elements and said stack extending between said read head and said write head;
- a second electrically conductive non-magnetic shield element positioned so that the read head lies between said stack and said second element;
- a third electrically conductive non-magnetic shield element positioned so that the write head lies between said stack and said third element;
- each conductive shield element having first and second ends, the first ends of adjacent elements lying in close proximity and the second ends of adjacent elements lying in close proximity;
- and including a first electrically conductive layer plated on to all of said first ends and extending without interruption between said first ends of said conductive elements and a second electrically conductive layer plated on to all of said second ends and extending without interruption between said second ends, said conductive elements and said conductive layers providing continuous low resistance electrically conductive paths extending around said read head and said write head for circulating currents induced in the conductive shielding.

2. A magnetic head assembly as claimed in claim 1 including a plurality of read heads and a plurality of write heads positioned for reading and writing in a plurality of parallel tracks of a record medium.

3. A magnetic head assembly as claimed in claim 2 including shields positioned between adjacent read heads and between adjacent write heads.

4. A magnetic head assembly consisting of a magnetic read head, a magnetic write head and electrically conductive shielding co-operating with said magnetic heads to reduce the level of signals induced directly in the read head as a result of energisation of the write head, said assembly including

- a first body member of electrically conductive non-magnetic material extending between said read head and said write head;
- a second body member of electrically conductive non-magnetic material positioned so that the read head lies between said first and second body members;
- a third body member of electrically conductive non-magnetic material extending between said first body member and said write head;
- a fourth body member of electrically conductive non-magnetic material positioned so that the write head lies between said third and fourth body members;
- each body member having a first and a second end opposite said first end and being positioned with said first ends adjacent one another and said second ends adjacent one another;
- and electrically conductive layers plated on to the body members to provide electrical connections between the first ends of the first and second ends of the first and second body members, between the first ends of the third and fourth body members and between the second ends of the third and fourth body members, the electrically conductive layers in conjunction with the body members providing low resistance electrically conductive paths for circulating currents induced in the body members.

5. A magnetic head assembly as claimed in claim 4 in which said electrically conductive layers are arranged to provide an electrical connection between the first ends of all of the body members and a further electrical connection between the second ends of all of the body members.

6. A magnetic head assembly as claimed in claim 5 including a plurality of read heads and a plurality of write heads; each read head comprising a pair of co-operating magnetic cores, one core of each pair being contained in said first body member and the other core of each pair being contained in said second body member; and each write head comprising a further pair of cooperating magnetic cores, one core of each pair being contained in said third body member and the other core of each pair being contained in said fourth body member.

* * * * *